US012700317B2

(12) United States Patent
Khan et al.

(10) Patent No.: US 12,700,317 B2
(45) Date of Patent: Aug. 4, 2026

(54) DYNAMIC FLIGHT OPERATION OPTIMIZATION

(71) Applicant: HONEYWELL INTERNATIONAL INC., Charlotte, NC (US)

(72) Inventors: Kalimulla Khan, Bangalore (IN); Kirupakar J, Madurai (IN); Ramkumar Rajendran, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/644,204

(22) Filed: Apr. 24, 2024

(65) Prior Publication Data

US 2024/0404414 A1 Dec. 5, 2024

(51) Int. Cl.

| | |
|---|---|
| ***G08G 5/34*** | (2025.01) |
| ***G08G 5/26*** | (2025.01) |
| ***G08G 5/55*** | (2025.01) |
| ***G08G 5/59*** | (2025.01) |
| ***G08G 5/76*** | (2025.01) |

(52) U.S. Cl.

CPC ................ *G08G 5/34* (2025.01); *G08G 5/26* (2025.01); *G08G 5/55* (2025.01); *G08G 5/59* (2025.01); *G08G 5/76* (2025.01)

(58) Field of Classification Search

CPC .. G08G 5/34; G08G 5/26; G08G 5/55; G08G 5/59; G08G 5/76; G08G 5/21; G08G 5/53; G08G 5/723; G08G 5/58

USPC ............................................................. 701/3

See application file for complete search history.

(56) References Cited

U.S. PATENT DOCUMENTS

| | | | | |
|---|---|---|---|---|
| 9,171,473 | B1 | 10/2015 | McNally et al. | |
| 9,858,825 | B2 | 1/2018 | Vilaplana et al. | |
| 10,539,654 | B1 | 1/2020 | Weichbrod | |
| 10,909,858 | B2 | 2/2021 | Schwartz et al. | |
| 10,991,255 | B2 | 4/2021 | Hochwarth et al. | |
| 11,393,343 | B2 * | 7/2022 | Litvova | G08G 5/26 |

OTHER PUBLICATIONS

SITA, SITA eWAS—Weather visualized, intuitively, 8 pages. https://www.sita.aero/solutions/sita-for-aircraft/applications/sita-ewas/.

National Aeronautics and Space Administration NASA, An Advanced Trajectory-Based Operations Prototype Tool and Focus Group Evaluation, NASA/TM-2017-219670, Sep. 2017, 57 pages.

* cited by examiner

*Primary Examiner* — Maceeh Anwari

(74) *Attorney, Agent, or Firm* — Alston & Bird LLP

(57) ABSTRACT

Techniques for generating flight operation recommendation for an aircraft are described. In operation, a flight safety hazard is detected on a flight path corresponding to a current flight operation of an aircraft. In response, the current flight operation is modified to generate a modified flight operation. A plurality of avionics parameters is then obtained from avionics systems available onboard the aircraft. A variation in the flight safety hazard is then detected based on at least one avionics parameter from the plurality of avionics parameters. Upon ascertaining the variation to be detrimental to the modified flight operation of the aircraft, the plurality of avionics parameters is analysed using a flight operation recommendation model to generate a plurality of flight operation recommendations. A flight operation recommendation from the plurality of flight operation recommendations is then applied to the modified flight operation.

17 Claims, 11 Drawing Sheets

DYNAMIC FLIGHT OPERATION OPTIMIZATION

BACKGROUND

Weather plays a significant role in aircraft flight operations and flight safety. Weather hazards, such as hurricanes, tornadoes, and thunderstorms, have a direct and/or indirect influence on the flight safety. For instance, thunderstorms can generate strong winds, hail, and lightning which can damage aircraft avionics systems, thereby disrupting navigation and communication. Turbulence can cause sudden changes in altitude and airspeed, which can be uncomfortable for passengers and potentially dangerous for unsecured items. Icing accumulated on the wings and control surfaces of the aircraft can reduce lift and increase drag, thereby affecting the aircraft's ability to maintain altitude and maneuver. Fog and low visibility can make it difficult for pilots to see the runway or other aircraft, thereby increasing the risk of a collision.

Figure 1:
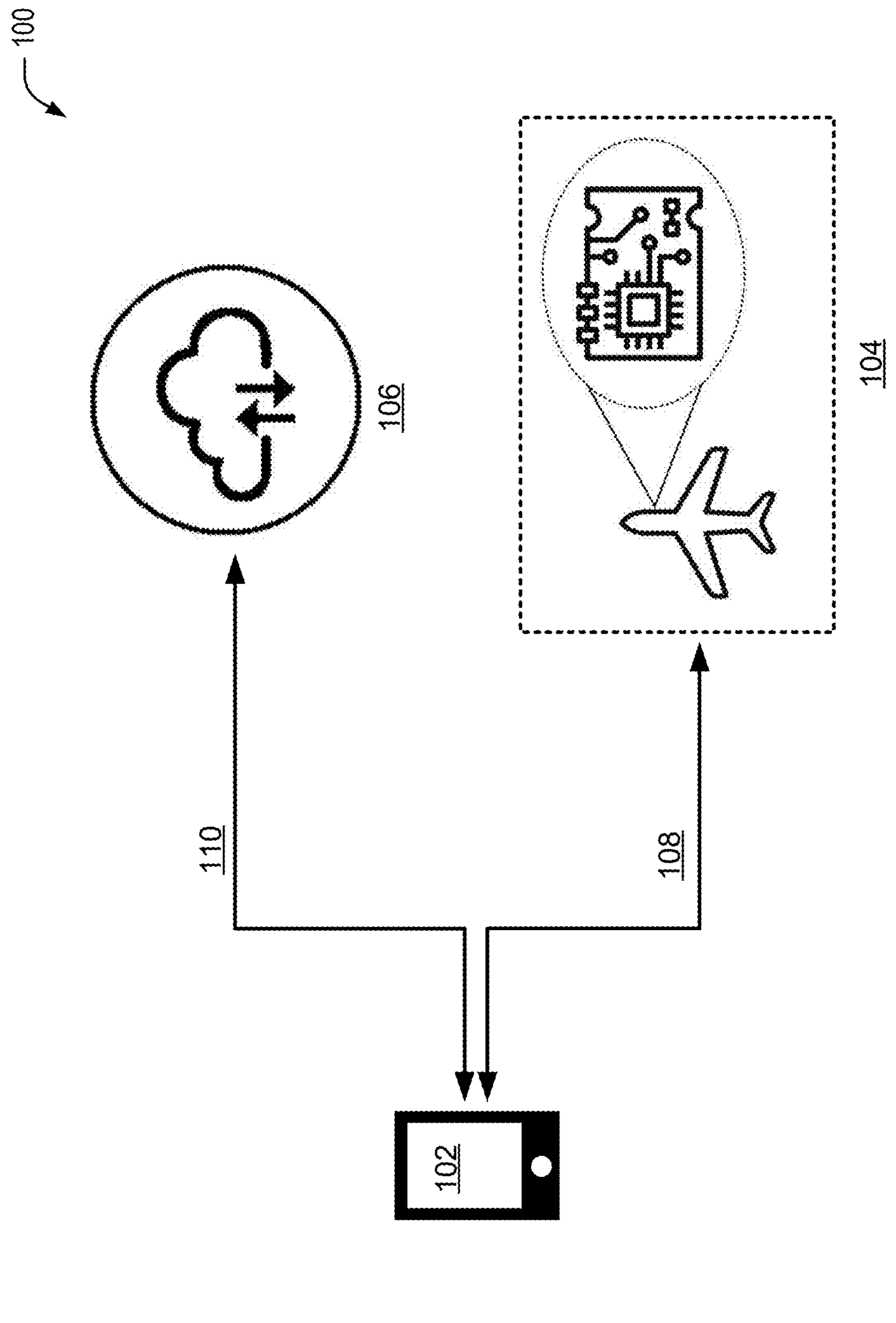
FIG. 1 illustrates an environment for implementing a flight operation recommendation system, in accordance with an example of the present subject matter.

Throughout the drawings, identical reference numbers designate similar, but not necessarily identical, elements. The drawings provide examples and/or implementations consistent with the description; however, the description is not limited to the examples and/or implementations provided in the drawings.

DETAILED DESCRIPTION

Aircraft flight operations are generally controlled based on instructions received from various Air Traffic Control (ATC) towers situated near aerodromes along with other ATC centers. For instance, an ATC tower may communicate preflight information that may include a flight path and weather forecast corresponding to the flight path to an aircraft before the aircraft takes off from the ground. Once the aircraft takes off and leaves the ATC tower's airspace, the aircraft may enter an Air route traffic control center's (ARTCC) airspace. While the aircraft passes through the ARTCC's airspace, the aircraft may be monitored and provided with in-air information to the aircraft, such as modifications to an original flight path of the aircraft, in view of the weather and air-traffic information around the aircraft. Particularly, if the analysis of the weather and air-traffic information indicates any potential flight safety incident, the ARTCC suggests modifications to the original flight path to avoid such flight safety incidents.

An ARTCC typically utilizes the information received from different satellites for identification of adverse flight conditions in the flight path for the aircraft and recommends alternative flight paths to the aircraft. The alternative flight paths are usually recommended upon receiving a request for alternative flight paths from a pilot of the aircraft. Upon receiving the request, an air traffic controller at the ARTCC manually identifies the alternative flight paths based on the analysis of the updated weather and air-traffic information. The ARTCC subsequently communicates the identified alternative flight paths to the pilot.

As the alternative flight paths are identified manually by air traffic controllers stationed at the ARTCC, the accuracy of the identified alternative flight paths is subject to the experience and skillset of the air traffic controller and thus, is prone to errors. Further, such methods for identification of the alternative flight paths do not account for dynamic nature of certain flight safety hazards, such as weather conditions around the aircraft. For instance, when a pilot is instructed to take an alternative flight path for avoiding a weather hazard present on the original flight path, the weather hazard may also progress towards the alternative flight path. In such a situation, owing to the paucity of time, the ARTCC may not be able to provide another alternative flight path and the pilot may be forced to fly the aircraft through the weather hazard. Accordingly, such methods for identification of the alternative flight paths are also rendered inefficient.

According to examples of the present subject matter, techniques for flight operation optimization for an aircraft are described.

In an example implementation, a flight safety hazard on a flight path corresponding to a current flight operation of an aircraft may be detected. Upon detecting the flight safety hazard, the current flight operation of the aircraft may be modified to generate a modified flight operation. In an example, the current flight operation of the aircraft may be modified upon determining the flight safety hazard to be detrimental to the current flight operation. In the example, modification of the current flight operation of the aircraft may involve application of an alternative flight path to the current flight operation to avoid the flight safety hazard.

Thereafter, a plurality of avionics parameters of the aircraft may be obtained. The plurality of avionics parameters may be obtained from avionics systems available onboard the aircraft and may be indicative of an aircraft aviation context corresponding to the modified flight operation of the aircraft.

A variation in the flight safety hazard may then be identified based on at least one avionics parameter from the plurality of avionics parameters. Subsequently, it may be ascertained that the variation in flight safety hazard is detrimental to the modified flight operation of the aircraft.

Upon ascertaining the variation in flight safety hazard to be detrimental to the modified flight operation, the plurality of avionics parameters may be analysed using a flight operation recommendation model to generate a plurality of flight operation recommendations. The flight operation recommendation model may be trained based on historical flight operations data corresponding to the variation in the flight safety hazard.

A flight operation recommendation from the plurality of flight operation recommendations may then be applied to the modified flight operation of the aircraft.

By identifying variations in flight safety hazards and adjusting the flight operation based on the analysis of the avionics parameters of the aircraft using the flight operation recommendation model trained based on historical flight operations corresponding to such variations, the present subject matter accounts for the dynamic nature of the flight safety hazards. As a result, the efficiency involved in modification of flight operations in response to various flight safety hazards is improved.

The above techniques are further described with reference to FIGS. 1 to 10. It would be noted that the description and the figures merely illustrate the principles of the present subject matter along with examples described herein and would not be construed as a limitation to the present subject matter. It is thus understood that various arrangements may be devised that, although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates an environment 100 for implementing a flight operation recommendation system 102, in accordance with an example of the present subject matter. Examples of the environment 100 may include, but are not limited to, aircraft, Air Traffic Control (ATC) tower, and Air Route Traffic Control Center (ARTCC).

In an example, the flight operation recommendation system 102 may be configured to generate flight operation recommendations for the aircraft. Examples of flight operation recommendation system 102 may vary depending on the environment 100 where the flight operation recommendation system is being implemented. For instance, when the environment 100 is aircraft, examples of flight operation recommendation system 102 may include, but are not limited to, Electronic Flight Bag (EFB) and on-board Flight Management System (FMS). On the other hand, when the environment 100 is ATC tower or ARTCC, examples of flight operation recommendation system 102 may include, but are not limited to, laptops, desktops, smartphones, and tablets.

The environment 100 may further include avionics systems available onboard the aircraft, where the avionics systems may be communicatively coupled to the flight operation recommendation system 102. Examples of the avionics systems 104 include, but are not limited to, Flight Management System (FMS), Enhanced Ground Proximity Warning Systems (EGPWS), weather radar, Auxiliary Power Unit (APU), engine, wheels, and brakes. In an example, the avionics systems 104 may communicate avionics parameters for the aircraft to the flight operation recommendation system 102.

Further, the environment 100 may include various aviation cloud services communicatively coupled to the flight operation recommendation system 102. In an example, the aviation cloud services facilitate retrieval of the contextual flight operation data for the aircraft, such as flight planning and dispatch data, weather data including Airmen's Meteorological Information (AIRMET) and Significant Meteorological Information (SIGMET), air traffic data, NOTAM data, runway data corresponding to the runways at the source and destination airports, and navigational data. Further, such aviation cloud services may communicate the contextual flight operation data to the flight operation recommendation system 102.

The flight operation recommendation system 102 may communicate with the avionics systems 104 and the aviation cloud services 106 via different communication networks. For instance, the flight operation recommendation system 102 may communicate with the avionics systems 104 via first communication network 108. The first communication network 108 can be a wireless or a wired network, or a combination thereof. Further, the first communication network 108 can be a collection of individual networks, interconnected with each other and functioning as a single large network. Examples of the first communication network 108 may vary depending on the environment 100 where the flight operation recommendation system is being implemented. For instance, when the environment 100 is aircraft, the first communication network 108 may include onboard Wi-Fi. On the other hand, when the environment is ATC tower or ARTCC, the first communication network 108 may include a combination of satellite communication and the onboard Wi-Fi.

Further, the flight operation recommendation system 102 may communicate with the aviation cloud services via the second communication network 110. The second communication network 110 can be a wireless or a wired network, or a combination thereof. Further, the second communication network 110 can be a collection of individual networks, interconnected with each other and functioning as a single large network. Examples of the second communication network 110 may vary depending on the environment 100 where the flight operation recommendation system is being implemented. For instance, when the environment 100 is the aircraft, the second communication network 110 may include satellite communication (SATCOM). On the other hand, when the environment 100 is the ATC tower or ARTCC, the second communication network 110 may be Global System for Mobile communication (GSM) network, Universal Mobile Telecommunications System (UMTS) network, Long Term Evolution (LTE) network, personal communications service (PCS) network, Time-division multiple access (TDMA) network, Code-Division Multiple Access (CDMA) network, next-generation network (NGN), public switched telephone network (PSTN), Integrated Services Digital Network (ISDN), or a combination thereof.

In operation, the flight operation recommendation system 102 may detect a flight safety hazard on a flight path corresponding to a current flight operation of the aircraft. The current flight operation of the aircraft may be a flight operation of the aircraft from a source airport to a destination airport. Further, the flight safety hazard may be indicative of a condition or an event that has the potential to cause harm or disrupt safe flight operations. Examples of the flight safety hazards may include, but are not limited to, thunderstorms, icing, turbulence, fog and low visibility, hurricanes and tornadoes, volcanic ash, bird strikes, runway contamination, and air traffic congestion.

The flight operation recommendation system 102 may then determine if the flight safety hazard is detrimental to the current flight operation of the aircraft. If the flight operation recommendation system 102 determines the flight safety hazard to be detrimental, the flight operation recommendation system 102 may modify the current flight operation to generate a modified flight operation.

The flight operation recommendation system 102 may then obtain a plurality of avionics parameters of the aircraft from avionics systems available onboard the aircraft. The plurality of avionics parameters may be indicative of an aircraft aviation context corresponding to the modified flight operation of the aircraft. The aircraft aviation context refers to the set of circumstances and conditions that are relevant to the operation of the aircraft, where such circumstances and conditions are derived from the plurality of avionics parameters.

In an example implementation, upon obtaining the plurality of avionics parameters, the flight operation recommendation system 102 may detect a variation in the flight safety hazard based on at least one avionics parameter from the plurality of avionics parameters. In the example, the flight operation recommendation system 102 may then ascertain the variation in flight safety hazard to be detrimental to the modified flight operation of the aircraft.

Subsequently, the flight operation recommendation system 102 may analyse the plurality of avionics parameters using a flight operation recommendation model to generate a plurality of flight operation recommendations. The flight operation recommendation model may be trained on historical flight operations data corresponding to the variation in the flight safety hazard. In an example, the historical flight operations data may include data related to flight operations where the variations in flight safety hazards were observed after modification of the flight operations in response to initial detection of such flight safety hazards, mitigative actions initiated in response to the variations in the flight safety hazards, and the effects of such mitigative actions on the flight operations. In the example, the flight operation recommendation model may be a supervised machine learning model. Examples of the flight operation recommendation model may include, but are not limited to, Linear Regression, Logistic Regression, Linear Discriminant Analysis, Classification and Regression Trees, Naïve Bayes, K-Nearest Neighbors (KNN), Learning Vector Quantization (LVQ), Support Vector Machines (SVM), and Random Forest.

In another example implementation, upon obtaining the plurality of avionics parameters, the flight operation recommendation system 102 may receive contextual flight operation data corresponding to the modified flight operation of the aircraft. In an example, the contextual flight operation data may be indicative of an airspace aviation context corresponding to the modified flight operation of the aircraft. The airspace aviation context refers to the set of circumstances and conditions that are relevant to the operation of the aircraft, where such circumstances and conditions are derived from the contextual flight operation data.

The flight operation recommendation system 102 may then combine the plurality of avionics parameters and the contextual flight operation data to generate a fused aviation data set. The fused aviation data set may be indicative of a comprehensive aviation context corresponding to the modified flight operation of the aircraft. The comprehensive aviation context may include a variety of factors that influences flight operations, such as avionics parameters including data from onboard avionics systems, airspeed, altitude, heading, pitch, roll, yaw, and other flight dynamics information; weather conditions including current and forecasted weather phenomena along the flight path, including wind speed and direction, visibility, precipitation, temperature, and the presence of severe weather events like thunderstorms or icing conditions; air traffic including the presence, density, and movement of other aircraft in the vicinity, as well as any air traffic control restrictions or advisories that may affect the flight path; aircraft performance including the capabilities and limitations of the aircraft, such as fuel range, engine performance, and maneuverability, which can be affected by the aircraft's load, maintenance status, and other operational considerations; navigational aids including the status and availability of ground-based or satellite-based navigational aids that assist in determining the aircraft's position and guiding its flight path; regulatory requirements including applicable aviation laws, regulations, and procedures that govern flight operations, including airspace classifications, flight rules, and communication protocols; and flight plan including the pre-determined route that the aircraft is intended to follow, including waypoints, altitudes, and expected times of arrival at various points along the route.

The flight operation recommendation system 102 may then detect a variation in the flight safety hazard based on the comprehensive aviation context. Thereafter, the flight operation recommendation system 102 may ascertain if the variation is detrimental to the modified flight operation. Upon determining the variation is detrimental to the modified flight operation, the flight operation recommendation system 102 may analyse the fused aviation data set using the flight operation recommendation model to generate a plurality of flight operation recommendations.

The flight operation recommendation system 102 may then apply a flight operation recommendation from the plurality of flight operation recommendations to the modified flight operation. Further details related to the generation of the plurality of flight operation recommendations are explained in conjunction with the forthcoming figures.

Figure 2:
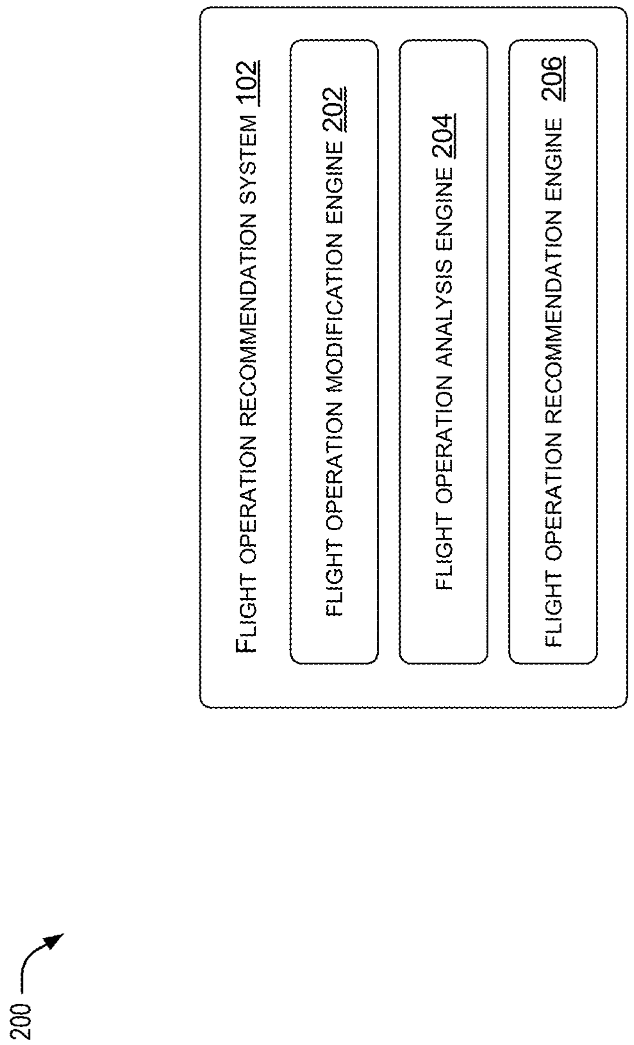
FIG. 2 illustrates a schematic of the flight operation recommendation system, in accordance with an example of the present subject matter.

FIG. 2 illustrates a schematic of the flight operation recommendation system 102, in accordance with an example of the present subject matter.

The flight operation recommendation system 102 may include a flight operation modification engine 202. The flight operation modification engine 202 may detect a flight safety hazard, such as a weather hazard, on a flight path corresponding to a current flight operation of an aircraft. Upon detecting the weather hazard, the flight operation modification engine 202 may modify the current flight operation to generate a modified flight operation. In an example, the flight operation modification engine 202 may modify the current flight operation upon determining the weather hazard to be detrimental to the current flight operation. Further, the flight operation modification engine 202 may modify the current flight operation by applying an alternative flight path in view of the weather hazard.

The flight operation recommendation system 102 may further include a flight operation analysis engine 204 coupled to the flight operation modification engine 202. The flight operation analysis engine 204 may obtain a plurality of avionics parameters from avionics systems available onboard the aircraft. The plurality of avionics parameters may be indicative of an aviation context corresponding to the modified flight operation of the aircraft. The flight operation analysis engine 204 may then detect a variation in the weather hazard based on at least one avionics parameter from the plurality of avionics parameters. In an example, the variation in the flight safety hazard comprises movement of the weather hazard towards the alternative flight path. The flight operation analysis engine 204 may ascertain if the variation in weather hazard to be detrimental to the modified flight operation of the aircraft.

Upon determining the variation in weather hazard to be detrimental to the modified flight operation of the aircraft, the flight operation analysis engine 204 may analyse the plurality of avionics parameters using the flight operation recommendation model to generate a plurality of flight operation recommendations in view of the weather hazard.

The flight operation recommendation system 102 may further include flight operation recommendation engine 206. In an example, the flight operation recommendation engine 206 may apply a flight operation recommendation from the plurality of flight operation recommendations to the modified flight operation of the aircraft.

Figure 3:
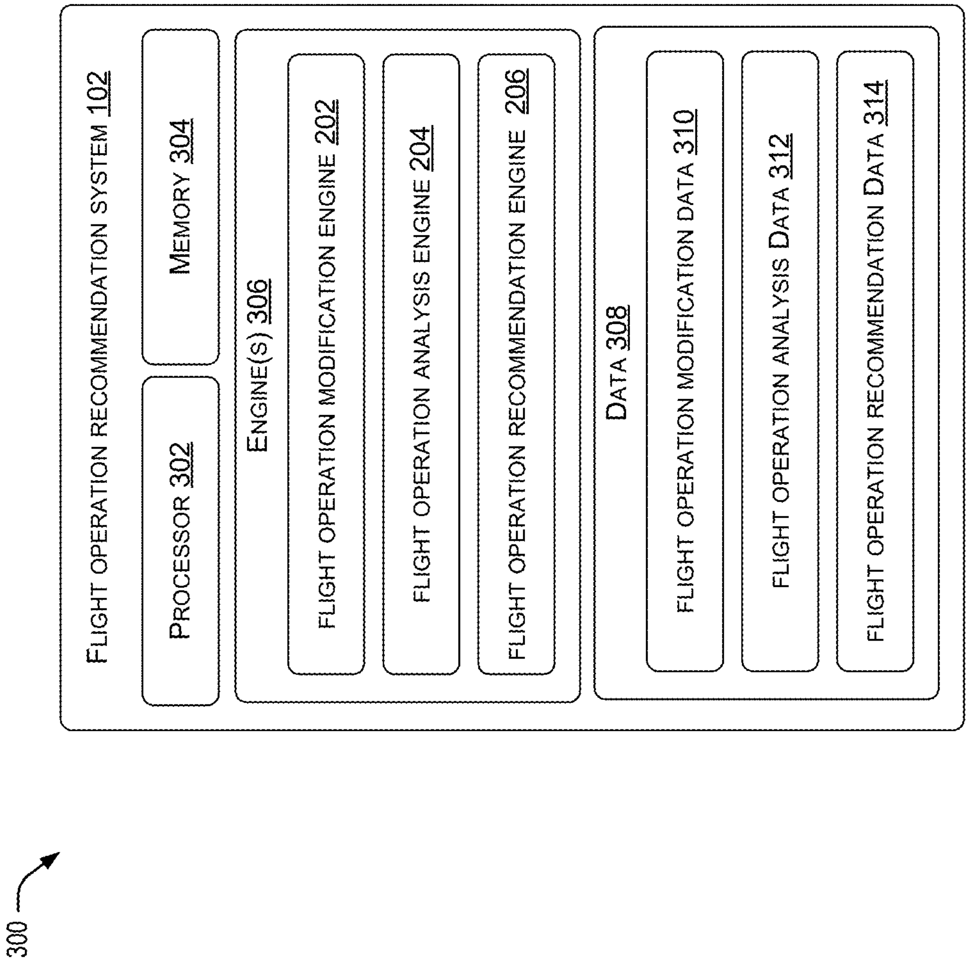
FIG. 3 illustrates the schematic of the flight operation recommendation system, in accordance with another example of the present subject matter.

FIG. 3 illustrates the schematic of the flight operation recommendation system 102, in accordance with another example of the present subject matter. As explained earlier, the flight operation recommendation system 102 may be configured to generate flight operation recommendations for the aircraft.

In an example, the flight operation recommendation system 102 includes a processor 302 and a memory 304 coupled to the processor 302. The functions of the various elements shown in the FIGs., including any functional blocks labelled as "processor(s)", may be provided through the use of dedicated hardware as well as hardware capable of executing instructions. When provided by a processor, the functions may be provided by a single dedicated processor, by a single shared processor, or by a plurality of individual processors, some of which may be shared. Moreover, explicit use of the term "processor" would not be construed to refer exclusively to hardware capable of executing instructions, and may implicitly include, without limitation, digital signal processor (DSP) hardware, network processor, application specific integrated circuit (ASIC), field programmable gate array (FPGA), read only memory (ROM) for storing instructions, random access memory (RAM), non-volatile storage. Other hardware, conventional and/or custom, may also be included.

The memory 304 may include any computer-readable medium including, for example, volatile memory (e.g., RAM), and/or non-volatile memory (e.g., EPROM, flash memory, etc.).

The flight operation recommendation system 102 may further include engine(s) 306, where the engine(s) 306 may include flight operation modification engine 202, the flight operation analysis engine 204, and the flight operation recommendation engine 206. For the ease of reference, the flight operation modification engine 202, the flight operation analysis engine 204, and the flight operation recommendation engine 206 have been respectively referred to as the modification engine 202, the analysis engine 204, and the recommendation engine 206, hereinafter.

In an example, the engine(s) 306 may be implemented as a combination of hardware and firmware or software. In examples described herein, such combinations of hardware and firmware may be implemented in several different ways. For example, the firmware for the engine may be processor executable instructions stored on a non-transitory machine-readable storage medium and the hardware for the engine may include a processing resource (for example, implemented as either a single processor or a combination of multiple processors), to execute such instructions.

In the present examples, the machine-readable storage medium may store instructions that, when executed by the processing resource, implement the functionalities of the engine. In such examples, the flight operation recommendation system 102 may include the machine-readable storage medium storing the instructions and the processing resource to execute the instructions. In other examples of the present subject matter, the machine-readable storage medium may be located at a different location but accessible to flight operation recommendation system 102 and the processor 302.

The flight operation recommendation system 102 may further include data 308, that serves, amongst other things, as a repository for storing data that may be fetched, processed, received, or generated by the engine(s) 306. In an example, the data 308 may include flight operation modification data 310, flight operation analysis data 312, and flight operation modification data 314. In an example, the data 308 may be stored in the memory 304.

In operation, the modification engine 202 may detect a flight safety hazard on a flight path during a current flight operation of the aircraft. The current flight operation of the aircraft may be a flight operation of the aircraft from a source airport to a destination airport. Further, the flight safety hazard may be indicative of a condition or an event that has the potential to cause harm or disrupt safe flight operations. Examples of the flight safety hazards may include, but are not limited to, thunderstorms, turbulence, fog and low visibility, hurricanes and tornadoes, volcanic ash, bird strikes, runway contamination, and air traffic congestion.

Upon detection of the flight safety hazard on the flight path, the modification engine 202 may modify the current flight operation in view of the weather hazard to generate a modified flight operation. The modification engine 202 may modify the current flight operation upon determining the weather hazard to be detrimental to the current flight operation of the aircraft. In an example, the modification engine 202 may modify the current flight operation by applying an alternative flight path to the current flight operation. In the example, the modification engine 202 may receive the alternative flight path from an Air Traffic Controller stationed either at the ATC tower or the ARTCC.

Thereafter, the analysis engine 204 may obtain a plurality of avionics parameters from avionics systems available onboard the aircraft. The plurality of avionics parameters may be indicative of an aircraft aviation context corresponding to the modified flight operation of the aircraft. In an example, the analysis engine 204 may obtain the plurality of avionics parameters by employing various avionics Application Programming Interfaces (APIs). In the example, the analysis engine 204 may employ the avionics APIs to read the plurality of avionics parameters from an avionics data bus coupled to the avionics systems 104. The analysis engine 204 may subsequently store the plurality of avionics parameters in the flight operation analysis data 312.

In an example implementation, upon obtaining the plurality of avionics parameters, the analysis engine 204 may detect a variation in the flight safety hazard based on at least one avionics parameter from the plurality of avionics parameters. For instance, when the flight safety hazard is a weather hazard, such as tornado, the analysis engine 204 may detect variation in the flight safety hazard, such as movement of the tornado towards the alternative flight path, from the avionics parameter received from the on-board weather radar. Upon detection of the variation in the flight safety hazard, the analysis engine 204 may analyse the plurality of avionics parameters using the flight operation recommendation model to generate a plurality of flight operation recommendations.

In another example implementation, after obtaining the plurality of avionics parameters, the analysis engine 204 may further receive the contextual flight operation data corresponding to the modified flight operation of the aircraft. In an example, the analysis engine 204 may further receive the contextual flight operation data by employing various cloud APIs. In the example, the analysis engine 204 may store the contextual flight operation data in the flight operations analysis data 312. The analysis engine 204 may then combine the plurality of avionics parameters with the contextual flight operation data to generated fused flight aviation data. The fused flight operation data may be indicative of the comprehensive aviation context corresponding to the modified flight operation of the aircraft.

The analysis engine 204 may subsequently detect a variation in the flight safety hazard based on the comprehensive aviation context. In an example, the avionics system may rely on the comprehensive aviation context for detection of the variation in the flight safety hazard when the nature of the flight safety hazard is such that the variation cannot be detected based on the avionics systems available onboard the aircraft. For instance, flight safety hazards, such as volcanic ash, does not show up on the weather radar available onboard the aircraft. In such situation, the analysis engine 204 may analyse the comprehensive aviation context to detect the variations in the flight safety hazards. For instance, to detect variation in the volcanic ash, the analysis engine 204 may first determine a current geographical location of the aircraft based on at least one avionics parameter. The analysis engine 204 may then utilize an aviation cloud service to access SIGMETs indicative of current weather conditions around the current geographical location, compare an updated SIGMET with a previous SIGMET, and detect if the volcanic ash is moving towards the alternative flight path based on the comparison. In this manner, by using the comprehensive aviation context, the analysis engine 204 is enabled to reliably detect variations in the flight safety hazards.

In an example, upon determining the variation in the flight safety hazard, the analysis engine 204 may ascertain if the variation in the flight safety hazard is detrimental to the modified flight operation. Upon determining the variation to be detrimental to the modified flight operation, the analysis engine 204 may analyse the fused aviation data set using the flight operation recommendation model to generate a plurality of flight operation recommendations. As already explained, the flight operation recommendation model may be trained on historical flight operations data corresponding to the variation in the flight safety hazard.

The flight operation recommendation engine 206 may then apply a flight operation recommendation from the plurality of flight operation recommendations to the modified flight operation of the aircraft.

In an example, the analysis engine 204 may generate the plurality of flight operation recommendations along with flight operation parameters associated with such recommendations. The flight operation parameters may include flight time score, fuel consumption score, and ATC approval confidence score corresponding to the plurality of flight operation recommendations. The fuel consumption score may be indicative of fuel savings associated with a flight operation recommendation, the flight time score may be indicative of flight time reduction associated with the flight operation recommendation, and the ATC approval confidence score may be indicative of chances of approval of the flight operation recommendation by the ATC.

In the example, before the flight operation recommendation engine 206 applies a flight operation recommendation to the modified flight operation, the analysis engine 204 may select at least one flight operation recommendation from the plurality of flight operation recommendations and submit the at least one flight operation recommendation to the ATC for approval.

The analysis engine 204 may select the at least one flight operation recommendation for submission to the ATC for approval in various ways. In an example, the analysis engine 204 may select the at least one flight operation recommendation based on a user input, such as an input from a pilot of the aircraft. In another example, the analysis engine 204 may select the at least one flight operation recommendation based on the ATC approval confidence score. In yet another example, the analysis engine 204 may select the at least one flight operation recommendation based on the fuel consumption score. In yet another example, the analysis engine 204 may select the at least one flight operation recommendation based on the flight time score.

Further, a way of selection of the at least one flight operation recommendation for submission to the ATC may vary based on the current aviation context of the aircraft. In an example, the analysis engine 204, upon analysis of an avionics parameter, such as a flight schedule received from the FMS, may identify that the modified flight operation is delayed. In such a situation, the analysis engine 204 may identify at least one flight operation recommendation based on flight time score of the plurality of flight operation recommendations. In another example, the analysis engine 204, upon analysis of another avionics parameters, such as amount of fuel in a fuel tank and distance to the destination airport received from the FMS, may identify that the amount of fuel may not be enough to adopt a flight operation recommendation with a flight path longer than the alternative flight path. In such a situation, the analysis engine 204 may identify the at least one flight operation recommendation based on the fuel consumption score. That is, the analysis engine 204 may identify the at least one flight operation recommendation having fuel consumption score greater than a threshold. In yet another example, the analysis engine 204, upon analysis of contextual flight operation data, such as air traffic data, may identify that the aircraft is flying in an airspace having heavy air traffic. In such a situation, the analysis engine 204 may identify the at least one flight operation recommendation based on the ATC approval confidence score. In this manner, the likelihood of receiving the ATC approval for the at least one flight operation recommendation may be increased. In yet another example, the analysis engine 204, upon analysis of the various avionics parameters and the contextual flight operation data, may identify that the modified flight operation is delayed, the amount of fuel may not be enough to adopt a flight operation recommendation with a flight path longer than the alternative flight path, and the aircraft is flying in an airspace having heavy air traffic. In such a situation, the analysis engine 204 may identify the at least one flight operation recommendation based on the fuel consumption score, the flight time score, and the ATC approval confidence score.

Once the analysis engine 204 receives an approved flight operation recommendation from the ATC, the analysis engine 204 may store the approved flight operation recommendation in the flight operation recommendation data 314. The flight operation recommendation engine 206 may subsequently apply the approved flight operation recommendation to the modified flight operation of the aircraft.

By identifying variations in flight safety hazards and adjusting the flight operation based on the analysis of the avionics parameters of the aircraft using the flight operation recommendation model trained based on historical flight operations corresponding to such variations, the present subject matter accounts for the dynamic nature of the flight safety hazards. As a result, the efficiency involved in modification of flight operations in response to various flight safety hazards is improved.

Figure 4:
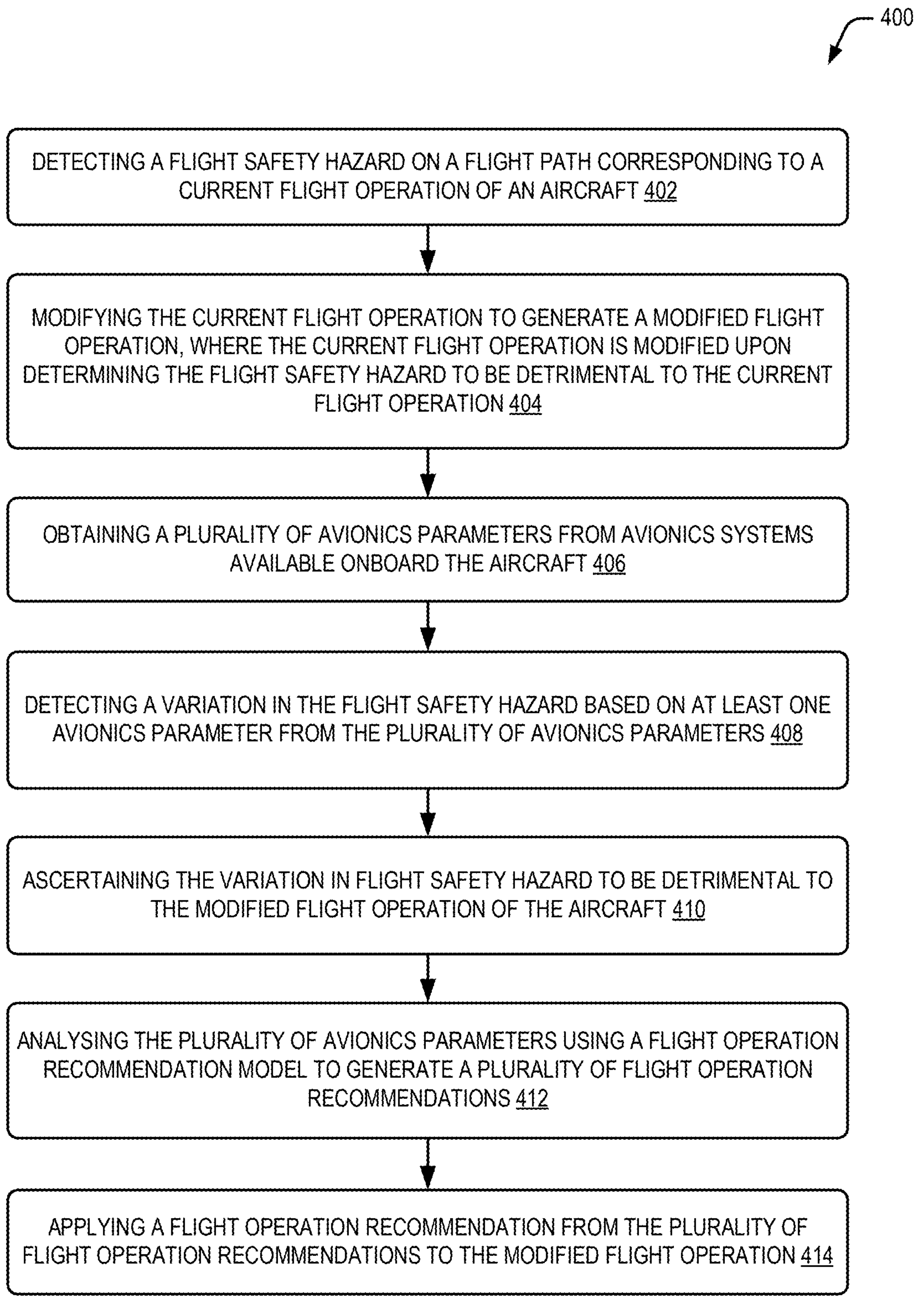
FIG. 4 illustrates a method for generating flight operation recommendations for an aircraft, in accordance with an example of the present subject matter.
Figure 5:
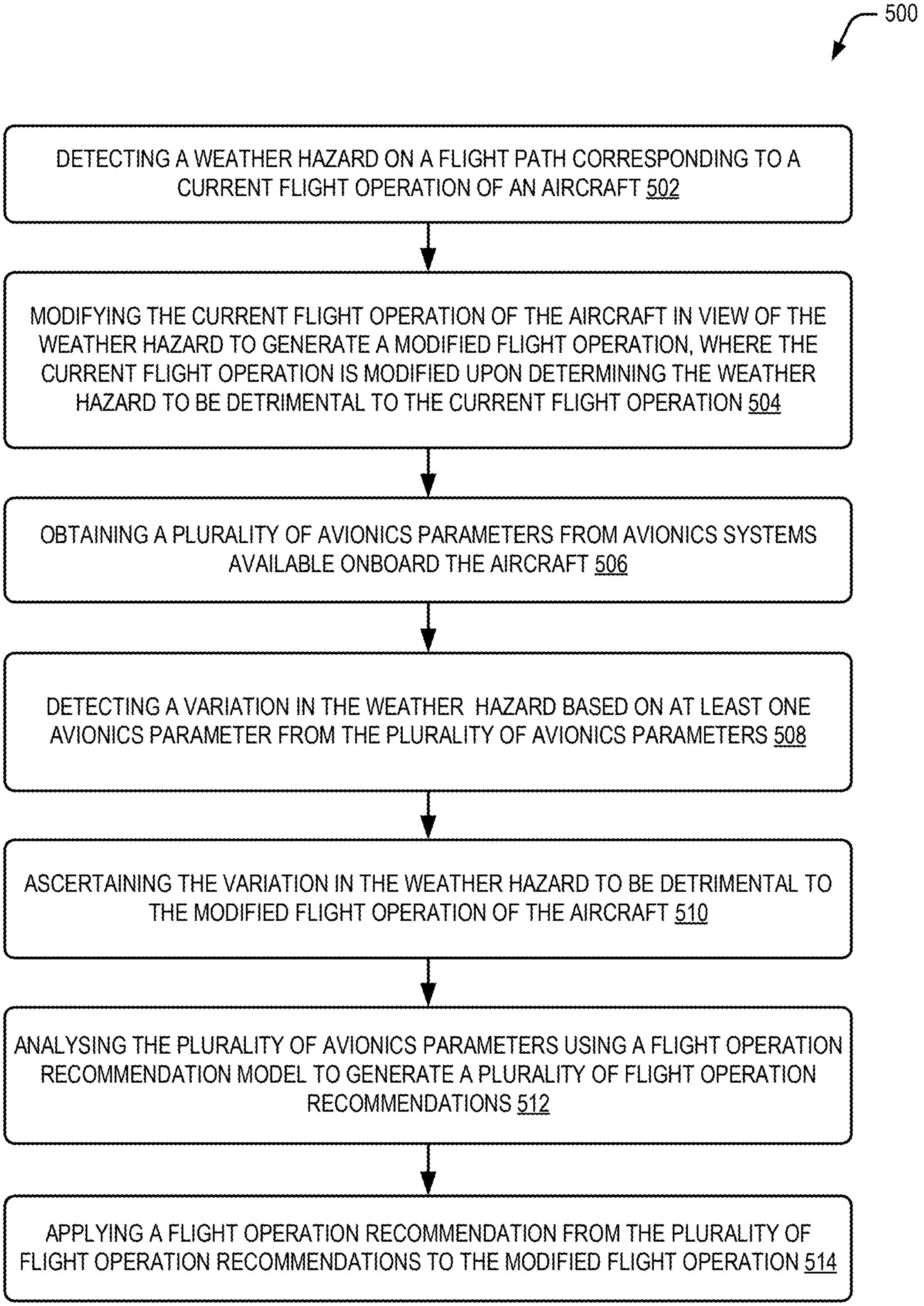
FIG. 5 illustrates the method for generating flight operation recommendations for an aircraft, in accordance with another example of the present subject matter.

FIGS. 4, 5, and 6 illustrate methods 400, 500, and 600 for generating flight operation recommendations for an aircraft, in accordance with examples of the present subject matter. The order in which the methods are described is not intended to be construed as a limitation, and any number of the described method blocks may be combined in any order to implement the methods, or an alternative method. Further, the methods 400, 500, and 600 may be implemented by processing resource or computing device(s) through any suitable hardware, non-transitory machine-readable instructions, or combination thereof.

It may also be understood that methods 400, 500, and 600 may be performed by programmed computing devices, such as the flight operation recommendation system 102, as depicted in FIG. 3. Furthermore, the methods 400, 500, and 600 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 400, 500, and 600 are described below with reference to the flight operation recommendation system 102, as described above; other suitable systems for the execution of these methods may also be utilized. Additionally, implementation of the method is not limited to such examples.

In FIG. 4, at block 402, a flight safety hazard may be detected on a flight path corresponding to a current flight operation of an aircraft. In an example, the flight safety hazard may be detected by the flight operation modification engine 202.

At block 404, the current flight operation may be modified to generate a modified flight operation. The current flight operation may be modified upon determining the flight safety hazard to be detrimental to the current flight operation. The modification of the current flight path may include receiving an alternative flight path to avoid the flight safety hazard from ATC and applying the alternative flight path to the current flight operation. In an example, the current flight operation may be modified by the flight operation modification engine 202.

At block 406, a plurality of avionics parameters for the aircraft may be obtained. The plurality of avionics parameters may be obtained from avionics systems available onboard the aircraft. Further, the plurality of avionics parameters may be indicative of an aircraft aviation context corresponding to the modified flight operation of the aircraft. In an example, the plurality of avionics parameters may be obtained by the flight operation analysis engine 204.

At block 408, a variation in the flight safety hazard may be detected. The variation in the flight safety hazard may be detected based on at least one avionics parameter from the plurality of avionics parameters. In an example, the variation in the flight safety hazard may be detected by the flight operation analysis engine 204.

At block 410, the variation in the flight safety hazard may be ascertained to be detrimental to the modified flight operation of the aircraft. In an example, the variation in the flight safety hazard may be ascertained to be detrimental by the flight operation analysis engine 204.

At block 412, the plurality of avionics parameters may be analysed using a flight operation recommendation model to generate a plurality of flight operation recommendations. The flight operation recommendation model may be trained on historical flight operations data corresponding to the variation in the flight safety hazard. In an example, the plurality of avionics parameters may be analysed by the flight operation analysis engine 204.

In an example, after generation of the plurality of flight operation recommendations, at least one flight operation recommendation from the plurality of flight operation recommendations may be selected and submitted to the ATC for approval. The at least one flight operation recommendation may be selected in various ways. In an example, the at least one flight operation recommendation may be selected based on a user input, such as an input from a pilot of the aircraft. In another example, the at least one flight operation recommendation may be selected based on the ATC approval confidence score. In yet another example, the at least one flight operation recommendation may be selected based on the fuel consumption score. In yet another example, the at least one flight operation recommendation may be selected based on the flight time score.

At block 414, a flight operation recommendation from the plurality of flight operation recommendations may be applied to the modified flight operation. In an example, the flight operation recommendation being applied to the modified flight operation may be an ATC approved flight operation recommendation. In an example, the flight operation recommendation may be applied to the modified flight operation by the flight operation recommendation engine 206.

In FIG. 5, at block 502, a weather hazard may be detected on a flight path corresponding to a current flight operation of an aircraft. In an example, the weather hazard may be detected by the flight operation modification engine 202.

At block 504, the current flight operation may be modified to generate a modified flight operation. The current flight operation may be modified upon determining the weather hazard to be detrimental to the current flight operation. The modification of the current flight path may include receiving an alternative flight path to avoid the weather hazard from ATC and applying the alternative flight path to the current flight operation. In an example, the current flight operation may be modified by the flight operation modification engine 202.

At block 506, a plurality of avionics parameters may be obtained from avionics systems available onboard the aircraft. The plurality of avionics parameters may be indicative of an aircraft aviation context corresponding to the modified flight operation of the aircraft. In an example, the plurality of avionics parameters may be obtained by the flight operation analysis engine 204.

At block 508, a variation in the weather hazard may be detected. The variation in the weather hazard may be detected based on at least one avionics parameter from the plurality of avionics parameters. The variation in the flight safety hazard may include movement of the weather hazard towards the alternative flight path. In an example, the variation in the weather hazard may be detected by the flight operation modification engine 202.

At block 510, the variation in the weather hazard may be ascertained to be detrimental to the modified flight operation of the aircraft. In an example, the variation in the weather hazard may be ascertained to be detrimental by the flight operation analysis engine 204.

At block 512, the plurality of avionics parameters may be analysed using a flight operation recommendation model to generate a plurality of flight operation recommendations. The flight operation recommendation model may be trained on historical flight operations data corresponding to the variation in the flight safety hazard. In an example, the plurality of avionics parameters may be analysed by the flight operation analysis engine 204.

At block 514, a flight operation recommendation from the plurality of flight operation recommendations may be applied to the modified flight operation. In an example, the flight operation recommendation may be applied to the modified flight operation by the flight operation recommendation engine 206.

Figure 6A:
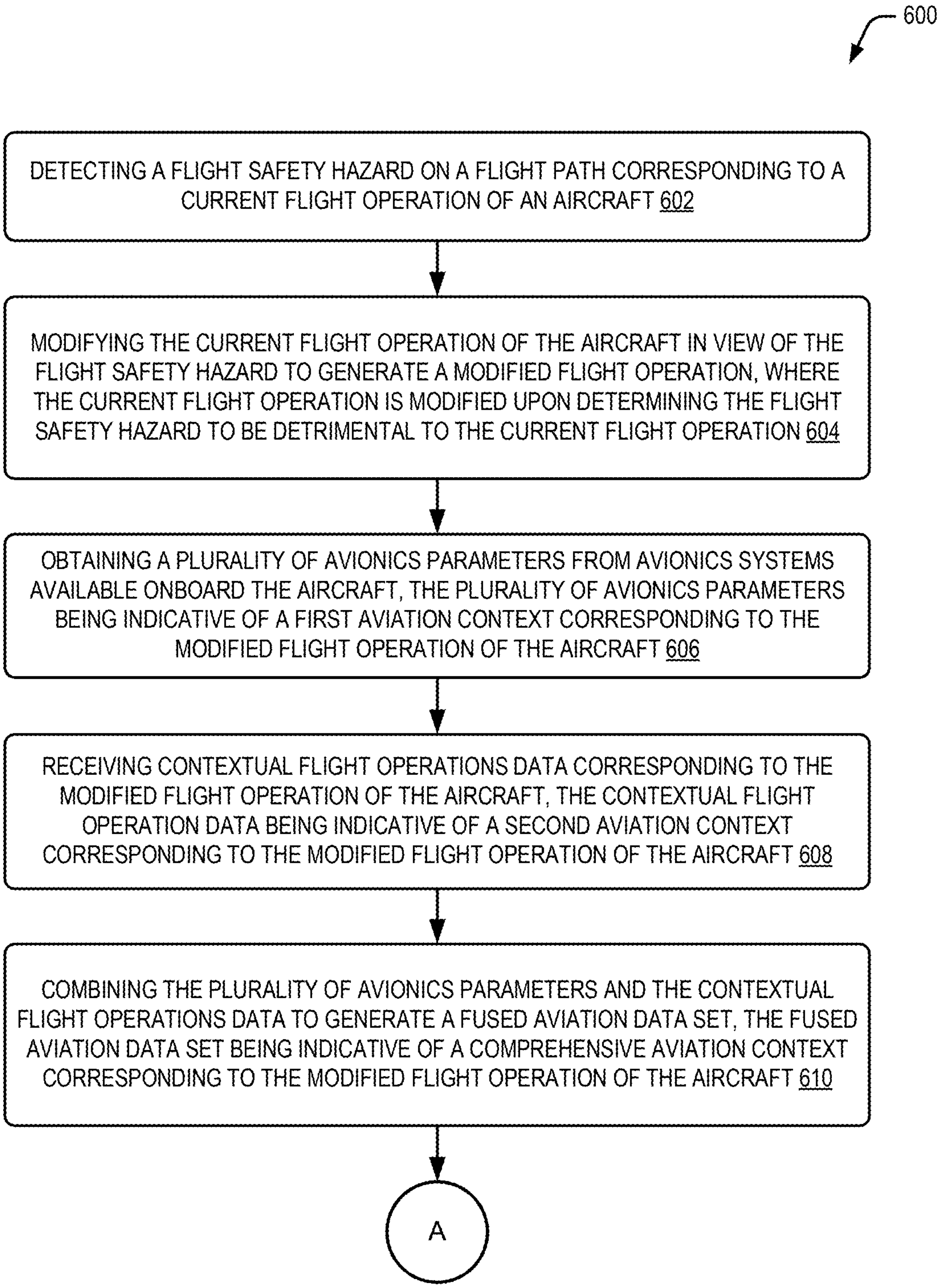
FIGS. 6A and 6B illustrate the method for generating flight operation recommendations for an aircraft, in accordance with yet another example of the present subject matter.
Figure 6B:
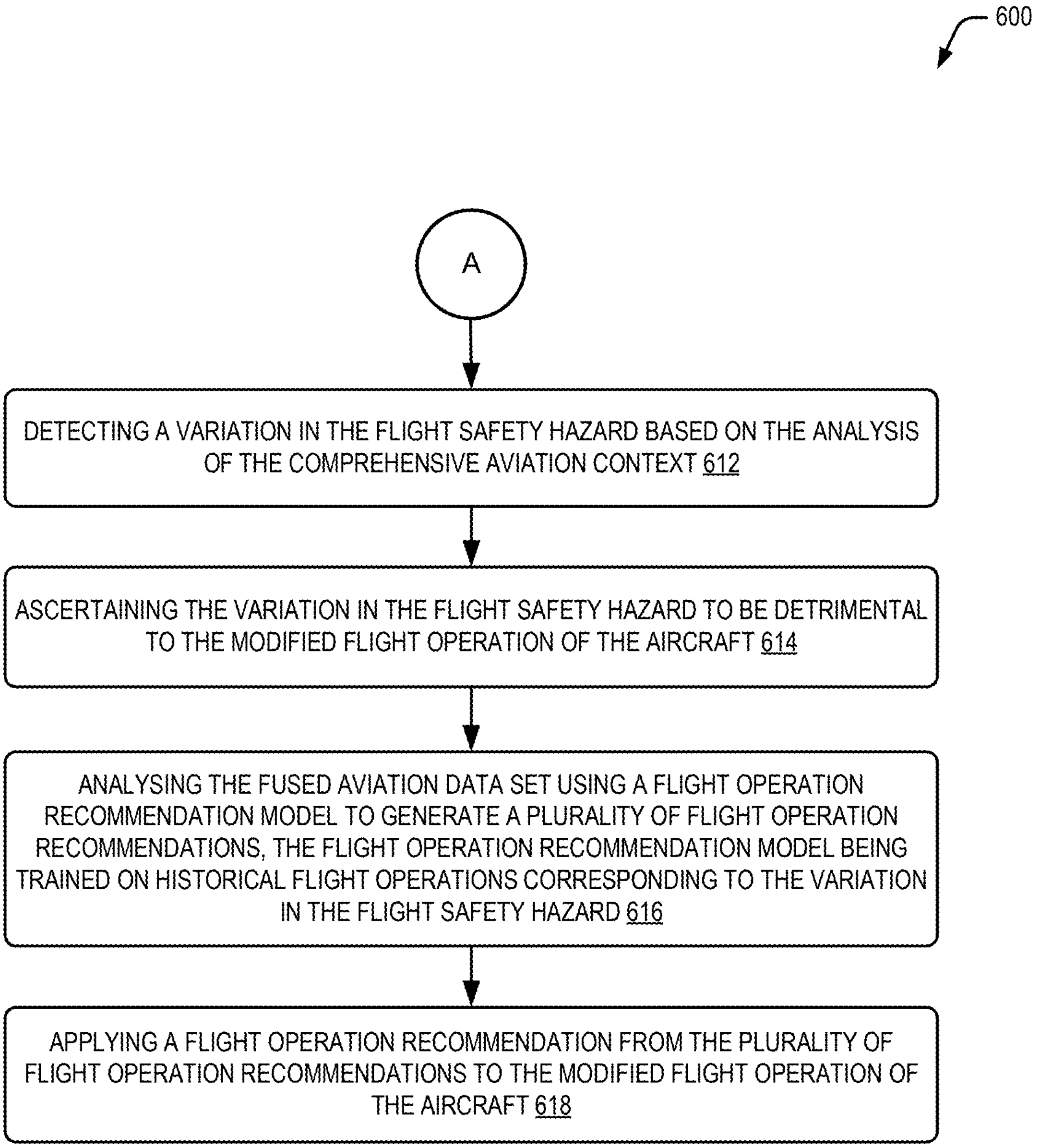

In FIGS. 6A and 6B, at block 602, a flight safety hazard may be detected on a flight path corresponding to a current flight operation of an aircraft. In an example, the flight safety hazard may be detected by the flight operation modification engine 202.

At block 604, the current flight operation may be modified to generate a modified flight operation. The current flight operation may be modified upon determining the flight safety hazard to be detrimental to the current flight operation. The modification of the current flight path may include receiving an alternative flight path to avoid the flight safety hazard from ATC and applying the alternative flight path to the current flight operation. In an example, the current flight operation may be modified by the flight operation modification engine 202.

At block 606, a plurality of avionics parameters for the aircraft may be obtained. The plurality of avionics parameters may be obtained from avionics systems available onboard the aircraft. Further, the plurality of avionics parameters may be indicative of an aircraft aviation context corresponding to the modified flight operation of the aircraft. In an example, the plurality of avionics parameters may be obtained by the flight operation analysis engine 204.

At block 608, contextual flight operation data corresponding to the modified flight operation of the aircraft may be received. The contextual flight operation data may be received from at least one aviation cloud service. Further, the contextual flight operation data may be indicative of an airspace aviation context corresponding to the modified flight operation of the aircraft. In an example, the contextual flight operation data may be obtained by the flight operation analysis engine 204.

At block 610, the plurality of avionics parameters and the contextual flight operation data may be combined to generate a fused aviation data set. The fused aviation data set may be indicative of a comprehensive aviation context corresponding to the modified flight operation of the aircraft. In an example, the plurality of avionics parameters and the contextual flight operation data may be combined by the flight operation analysis engine 204.

At block 612, a variation in the flight safety hazard may be detected based on the comprehensive aviation context. In an example, the variation in the flight safety hazard may be detected by the flight operation analysis engine 204.

At block 614, the variation in the flight safety hazard may be determined to be detrimental to the modified flight operation of the aircraft. In an example, variation in the flight safety hazard may be determined to be detrimental by the flight operation analysis engine 204.

At block 616, the fused aviation data set may be analysed to generate a plurality of flight operation recommendations. The fused aviation data set may be analysed using a flight operation recommendation model, where the flight operation recommendation model may be trained on historical flight operations data corresponding to the variation in the flight safety hazard. In an example, the fused aviation data set may be analysed by the flight operation analysis engine 204.

At block 618, a flight operation recommendation from the plurality of flight operation recommendations may be applied to the modified flight operation of the aircraft. In an example, the flight operation recommendation may be applied to the modified flight operation by the flight operation recommendation engine 206.

Figure 7:
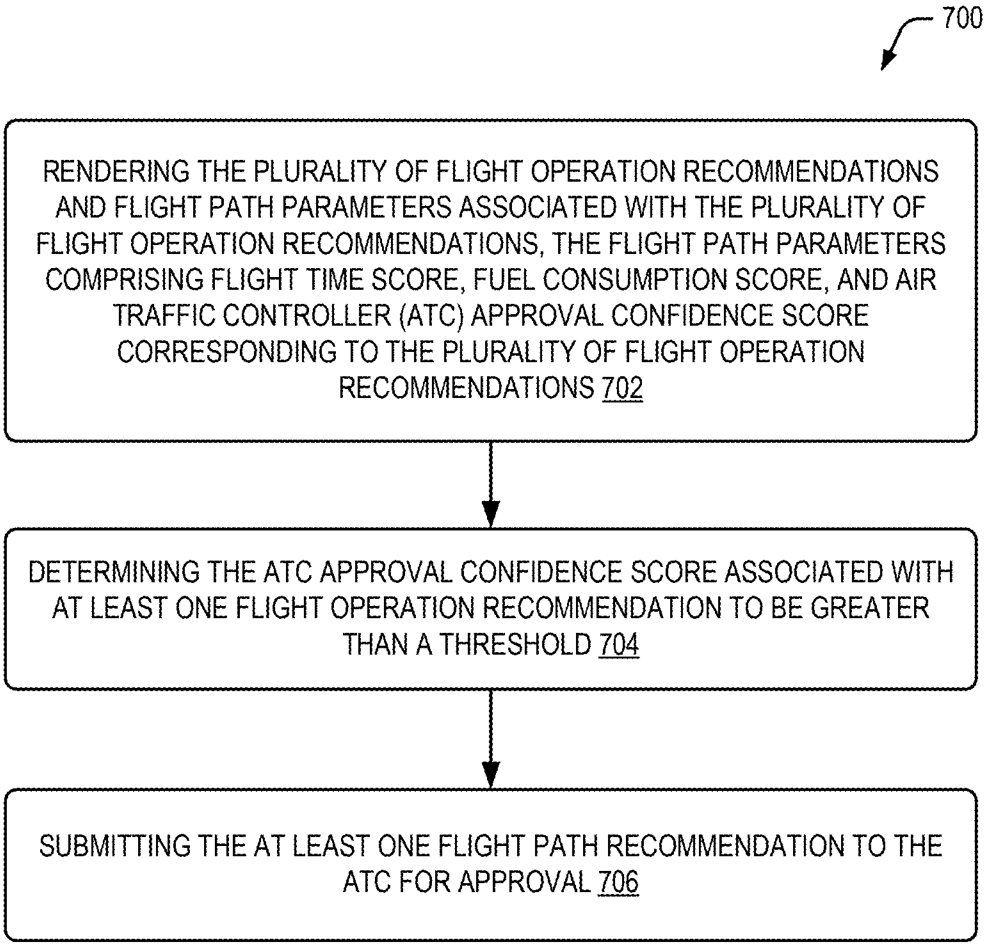
FIG. 7 illustrates a method for obtaining ATC approval for a flight operation recommendation, in accordance with an example of the present subject matter.
Figure 8:
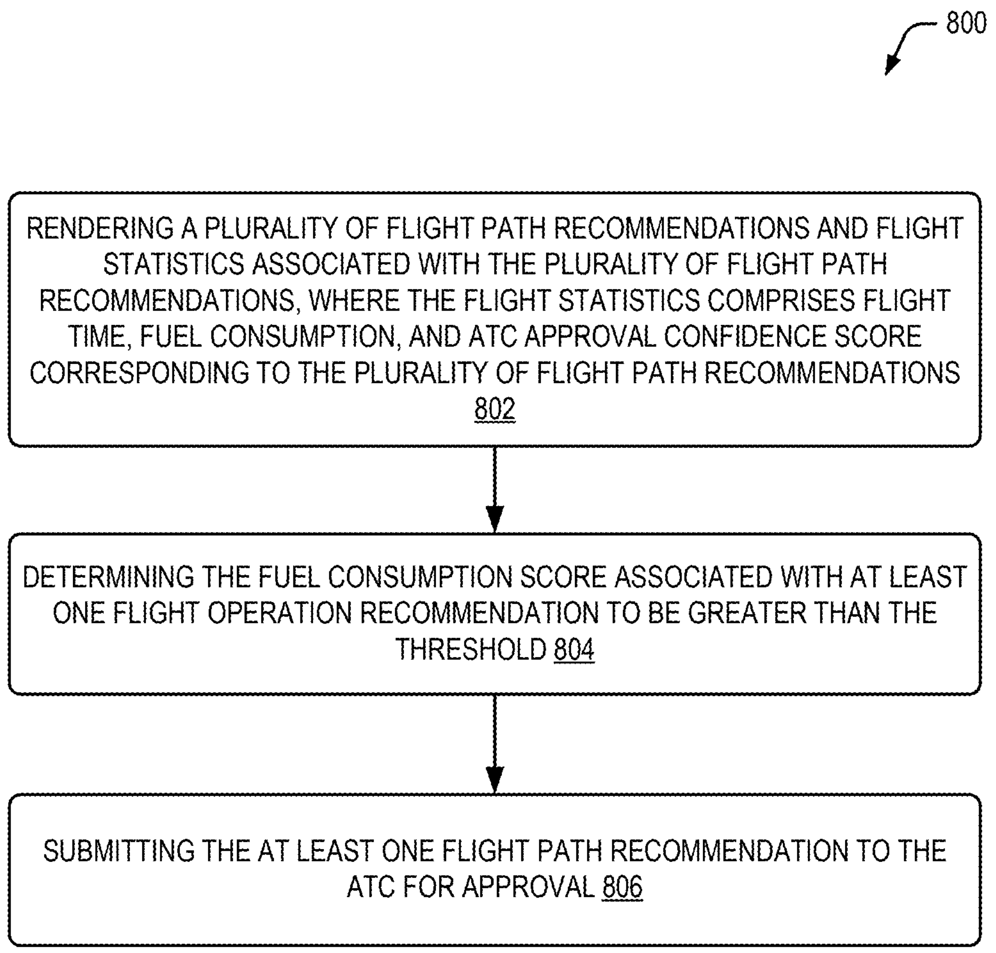
FIG. 8 illustrates the method for obtaining ATC approval for a flight operation recommendation, in accordance with another example of the present subject matter.
Figure 9:
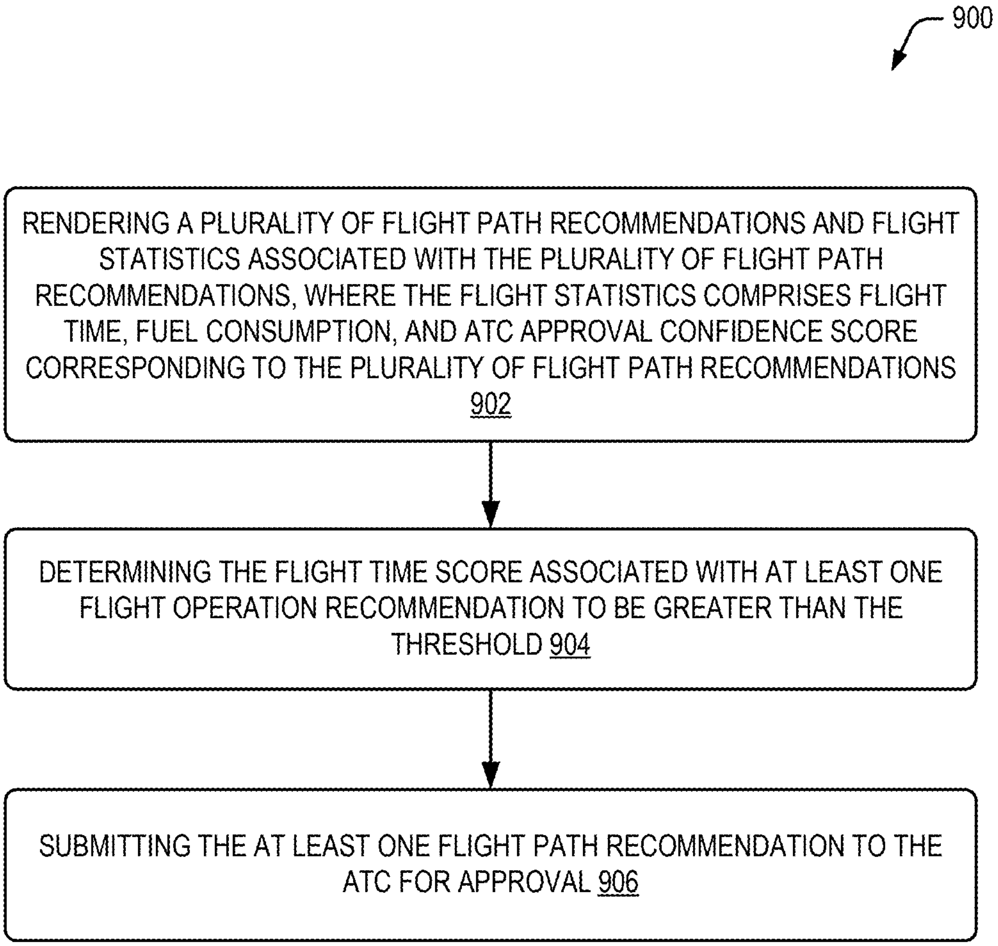
FIG. 9 illustrates the method for obtaining ATC approval for a flight path recommendation, in accordance with yet another example of the present subject matter.

FIGS. 7, 8, and 9 illustrate methods for obtaining ATC approval for a flight operation recommendation, in accordance with examples of the present subject matter. The order in which the methods are described is not intended to be construed as a limitation, and any number of the described method blocks may be combined in any order to implement the methods, or an alternative method. Further, the methods 700, 800, and 900 may be implemented by processing resource or computing device(s) through any suitable hardware, non-transitory machine-readable instructions, or combination thereof.

It may also be understood that methods 700, 800, and 900 may be performed by programmed computing devices, such as the flight operation recommendation system 102, as depicted in FIG. 3. Furthermore, the methods 700, 800, and 900 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media. The methods 700, 800, and 900 are described below with reference to the flight operation recommendation system 102, as described above; other suitable systems for the execution of these methods may also be utilized. Additionally, implementation of the method is not limited to such examples.

In FIG. 7, at block 702, the plurality of flight operation recommendations and flight operation parameters associated with the plurality of flight operation recommendations may be rendered. The flight operation parameters may include flight time score, fuel consumption score, and ATC approval confidence score corresponding to the plurality of flight operation recommendations.

The fuel consumption score may be indicative of fuel savings associated with a flight operation recommendation, the flight time score may be indicative of flight time reduction associated with the flight operation recommendation, and the ATC approval confidence score may be indicative of chances of approval of the flight operation recommendation by the ATC. In an example, the plurality of flight operation recommendations and flight operation parameters associated with the plurality of flight operation recommendations may be rendered by the analysis engine 204.

At block 704, the ATC approval confidence score for at least one flight operation recommendation from the plurality of flight operation recommendations may be determined to be greater than a threshold. In an example, the ATC approval confidence score for the at least one flight operation recommendation may be determined to be greater than the threshold by the flight operation analysis engine 204.

At block 706, the at least one flight operation recommendation may be submitted to the ATC for approval. In an example, the at least one flight operation recommendation may be submitted to the ATC for approval by the analysis engine 204.

In FIG. 8, at block 802, the plurality of flight operation recommendations and flight operation parameters associated with the plurality of flight operation recommendations may be rendered. In an example, the plurality of flight operation recommendations and flight operation parameters associated with the plurality of flight operation recommendations may be rendered by the analysis engine 204.

At block 804, the fuel consumption score for at least one flight operation recommendation from the plurality of flight operation recommendations may be determined to be greater than a threshold. In an example, the fuel consumption score for the at least one flight operation recommendation may be determined to be greater than the threshold by the flight operation analysis engine 204.

At block 806, the at least one flight operation recommendation may be submitted to the ATC for approval. In an example, the at least one flight operation recommendation may be submitted to the ATC for approval by the analysis engine 204.

In FIG. 9, at block 902, the plurality of flight operation recommendations and flight operation parameters associated with the plurality of flight operation recommendations may be rendered. In an example, the plurality of flight operation recommendations and flight operation parameters associated with the plurality of flight operation recommendations may be rendered by the analysis engine 204.

At block 904, the flight time score for at least one flight operation recommendation from the plurality of flight operation recommendations may be determined to be greater than a threshold. In an example, the flight time score for the at least one flight operation recommendation may be determined to be greater than the threshold by the flight operation analysis engine 204.

At block 906, the at least one flight operation recommendation may be submitted to the ATC for approval. In an example, the at least one flight operation recommendation may be submitted to the ATC for approval by the analysis engine 204.

Figure 10:
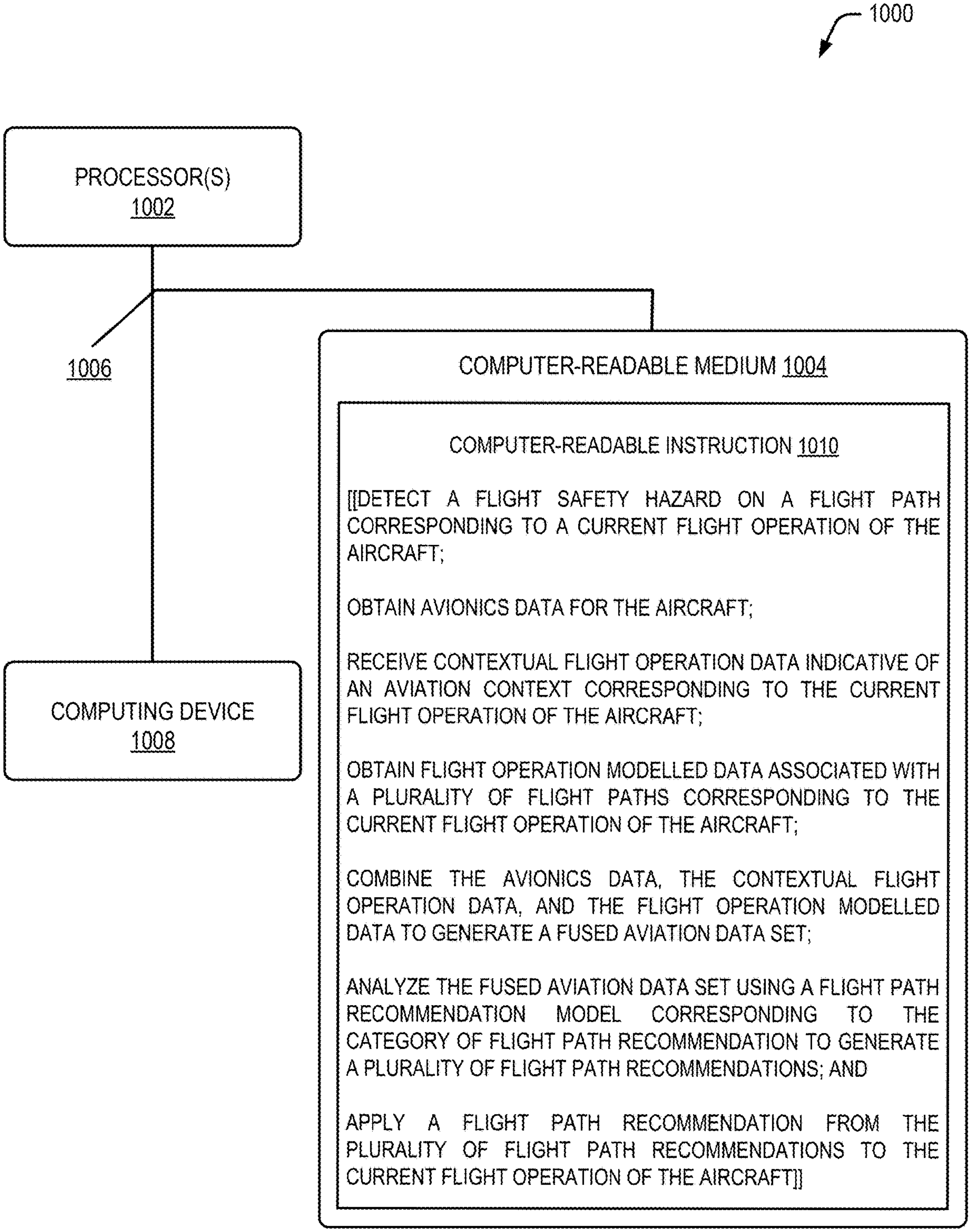
FIG. 10 illustrates a non-transitory computer-readable medium for generating flight path recommendations for an aircraft, in accordance with an example of the present subject matter.

FIG. 10 illustrates a non-transitory computer-readable medium for generating flight path recommendations for an aircraft, in accordance with an example of the present subject matter.

In an example, the computing environment 1000 includes processor 1002 communicatively coupled to a non-transitory computer readable medium 1004 through communication link 1006. In an example implementation, the computing environment 1000 may be for example, the flight operation recommendation system 102. In an example, the processor 1002 may have one or more processing resources for fetching and executing computer-readable instructions from the non-transitory computer readable medium 1004. The processor 1002 and the non-transitory computer readable medium 1004 may be implemented, for example, in the flight operation recommendation system 102.

The non-transitory computer readable medium 1004 may be, for example, an internal memory device or an external memory. In an example implementation, the communication link 1006 may be a network communication link, or other communication links, such as a PCI (Peripheral component interconnect) Express, USB-C (Universal Serial Bus Type-C) interfaces, I2C (Inter-Integrated Circuit) interfaces, etc. In an example implementation, the non-transitory computer readable medium 1004 includes a set of computer readable instructions 1010 which may be accessed by the processor 1002 through the communication link 1006 and subsequently executed for generating the flight operation recommendations for the aircraft. The processor(s) 1002 and the non-transitory computer readable medium 1004 may also be communicatively coupled to a computing device 1008 over the network.

Referring to FIG. 10, in an example, the non-transitory computer readable medium 1004 includes computer readable instructions 1010 that cause the processor 1002 to detect a flight safety hazard on a flight path corresponding to a current flight operation of the aircraft. The flight safety hazard may be indicative of a condition or an event that has the potential to cause harm or disrupt safe flight operations. Examples of the flight safety hazards may include, but are not limited to, thunderstorms, turbulence, fog and low visibility, hurricanes and tornadoes, volcanic ash, bird strikes, runway contamination, and air traffic congestion.

The instructions 1010 may further cause the processor 1002 to modify the current flight operation of the aircraft to generate a modified flight operation. In an example, the current flight operation may be modified upon determining the flight safety hazard to be detrimental to the current flight operation.

The instructions 1010 may then cause the processor 1002 to obtain a plurality of avionics parameters from avionics systems available onboard the aircraft. The plurality of avionics parameters may be indicative of an aircraft aviation context corresponding to the modified flight operation of the aircraft. The instructions 1010 may also cause the processor 1002 to receive contextual flight operations data corresponding to the modified flight operation of the aircraft. The contextual flight operation data may be received from at least one aviation cloud service. Further, the contextual flight operation data may be indicative of an airspace aviation context corresponding to the modified flight operation of the aircraft.

The instructions 1010 may then cause the processor 1002 to detect a variation in the flight safety hazard based on the comprehensive aviation context. Subsequently, the instructions 1010 may then cause the processor 1002 to ascertain the variation in the flight safety hazard to be detrimental to the modified flight operation of the aircraft.

Upon ascertaining the variation in the flight safety hazard to be detrimental, the instructions 1010 may cause the processor 1002 to analyse the fused aviation data set using a flight operation recommendation model to generate a plurality of flight operation recommendations. In an example, the flight operation recommendation model may be trained on historical flight operations data corresponding to the variation in the flight safety hazard.

The instructions 1010 may then cause the processor 1002 to apply a flight operation recommendation from the plurality of flight operation recommendations to the modified flight operation of the aircraft. In an example, before applying the flight operation recommendation to the modified flight operation of the aircraft, the instructions 1010 may cause the processor 1002 to select at least one flight operation recommendation from the plurality of flight operation recommendations and submit the at least one flight operation recommendation to the ATC for approval.

The instructions 1010 may cause the processor 1002 to select the at least one flight operation recommendation for submission to the ATC for approval in various ways. In an example, the instructions 1010 may cause the processor 1002 to select the at least one flight operation recommendation based on a user input, such as an input from a pilot of the aircraft. In another example, the instructions 1010 may cause the processor 1002 to select the at least one flight operation recommendation based on the ATC approval confidence score. In yet another example, the instructions 1010 may cause the processor 1002 to select the at least one flight operation recommendation based on the fuel consumption score. In yet another example, the instructions 1010 may cause the processor 1002 to select the at least one flight operation recommendation based on the flight time score.

By identifying variations in flight safety hazards and adjusting the flight operation based on the analysis of the avionics parameters of the aircraft using the flight operation recommendation model trained based on historical flight operations corresponding to such variations, the present subject matter accounts for the dynamic nature of the flight safety hazards. As a result, the efficiency involved in modification of flight operations in response to various flight safety hazards is improved.

Although examples of the present subject matter have been described in language specific to methods and/or structural features, it is to be understood that the present subject matter is not limited to the specific methods or features described. Rather, the methods and specific features are disclosed and explained as examples of the present subject matter.

We claim:

1. A method comprising:

detecting a flight safety hazard on a flight path corresponding to a current flight operation of an aircraft;

modifying the current flight operation to generate a modified flight operation, the current flight operation being modified upon determining the flight safety hazard to be detrimental to the current flight operation;

obtaining a plurality of avionics parameters from avionics systems available onboard the aircraft, the plurality of avionics parameters being indicative of an aircraft aviation context corresponding to the modified flight operation of the aircraft;

detecting a variation in the flight safety hazard based on at least one avionics parameter from the plurality of avionics parameters;

ascertaining the variation in the flight safety hazard to be detrimental to the modified flight operation of the aircraft;

analyzing the plurality of avionics parameters using a flight operation recommendation model to generate a plurality of flight operation recommendations, the flight operation recommendation model being a machine learning model trained on historical flight operations data corresponding to the variation in the flight safety hazard; and applying a flight operation recommendation from the plurality of flight operation recommendations to the modified flight operation;

wherein the modifying the current flight operation further comprises:

receiving an alternative flight path to avoid the flight safety hazard from ATC, wherein the flight safety hazard comprises a weather hazard and the variation in the flight safety hazard comprises movement of the weather hazard towards the alternative flight path; and applying the alternative flight path to the current flight operation.

2. The method of claim 1, further comprising rendering the plurality of flight operation recommendations and flight operation parameters associated with the plurality of flight operation recommendations, the flight operation parameters comprising flight time score, fuel consumption score, and Air Traffic Control (ATC) approval confidence score corresponding to the plurality of flight operation recommendations, the fuel consumption score being indicative of fuel savings associated with a flight operation recommendation, the flight time score being indicative of flight time reduction associated with the flight operation recommendation, and the ATC approval confidence score being indicative of chances of approval of the flight operation recommendation by the ATC.

3. The method of claim 2, further comprising:

determining the ATC approval confidence score associated with at least one flight operation recommendation to be greater than a threshold; and submitting the at least one flight operation recommendation to the ATC for approval.

4. The method of claim 2, further comprising:

determining the fuel consumption score associated with at least one flight operation recommendation to be greater than the threshold; and submitting the at least one flight recommendation to the ATC for approval.

5. The method of claim 2, further comprising:

determining the flight time score associated with at least one flight operation recommendation to be greater than the threshold; and submitting the at least one flight operation recommendation to the ATC for approval.

6. The method of claim 2, further comprising:

receiving a user selection for at least one flight path recommendation from the plurality of flight path recommendations; and submitting the at least one flight path recommendation to the ATC for approval.

7. A flight operation recommendation system comprising:

a flight operation modification engine to:

detect a weather hazard on a flight path corresponding to a current flight operation of an aircraft; and modify the current flight operation in view of the weather hazard to generate a modified flight operation, the current flight operation being modified upon determining the weather hazard to be detrimental to the current flight operation, and the current flight operation being modified by applying an alternative flight path in view of the weather hazard;

a flight operation analysis engine coupled to the flight operation modification engine to:

obtain a plurality of avionics parameters from avionics systems available onboard the aircraft, the plurality of avionics parameters being indicative of an aircraft aviation context corresponding to the modified flight operation of the aircraft;

detect a variation in the weather hazard based on at least one avionics parameter from the plurality of avionics parameters, wherein the variation in the flight safety hazard comprises movement of the weather hazard towards the alternative flight path;

ascertain the variation in the weather hazard to be detrimental to the modified flight operation of the aircraft; and analyze the plurality of avionics parameters using a flight operation recommendation model to generate a plurality of flight operation recommendations in view of the weather hazard, the flight operation recommendation model being a machine learning model trained on historical flight operations data corresponding to the variation in the weather hazard; and a flight operation engine to apply a flight operation recommendation from the plurality of flight operation recommendations to the modified flight operation of the aircraft;

wherein the modifying the current flight operation further comprises:

receiving an alternative flight path to avoid the flight safety hazard from ATC, wherein the flight safety hazard comprises a weather hazard and the variation in the flight safety hazard comprises movement of the weather hazard towards the alternative flight path; and applying the alternative flight path to the current flight operation.

8. The flight operation recommendation system of claim 7, wherein the flight operation recommendation engine is to render the plurality of flight operation recommendations and flight operation parameters associated with the plurality of flight operation recommendations, the flight operation parameters comprising flight time score, fuel consumption score, and ATC approval confidence score corresponding to the plurality of flight operation recommendations, the fuel consumption score being indicative of fuel savings associated with a flight operation recommendation, the flight time score being indicative of flight time reduction associated with the flight operation recommendation, and the ATC approval confidence score being indicative of chances of approval of the flight operation recommendation by the ATC.

9. The flight operation recommendation system of claim 8, wherein the flight operation recommendation engine is to:

determine the ATC approval confidence score associated with at least one flight operation recommendation to be greater than a threshold; and submit the at least one flight operation recommendation to the ATC for approval.

10. The flight operation recommendation system of claim 8, wherein the flight operation recommendation engine is to:

determine the fuel consumption score associated with at least one flight operation recommendation to be greater than the threshold; and submit the at least one flight operation recommendation to the ATC for approval.

11. The flight operation recommendation system of claim 8, wherein the flight operation recommendation engine is to:

determine the flight time score associated with at least one flight operation recommendation to be greater than the threshold; and submit the at least one flight operation recommendation to the ATC for approval.

12. The flight operation recommendation system of claim 8, wherein the flight operation recommendation engine is to:

receive a user selection for at least one flight path recommendation from the plurality of flight path recommendations; and submit the at least one flight path recommendation to the ATC for approval.

13. A non-transitory computer readable medium comprising computer-readable instructions that when executed cause a processing resource of a computing device to:

detect a flight safety hazard on a flight path corresponding to a current flight operation of an aircraft;

modify the current flight operation of the aircraft to generate a modified flight operation, the current flight operation being modified upon determining the flight safety hazard to be detrimental to the current flight operation;

obtain a plurality of avionics parameters from avionics systems available onboard the aircraft, the plurality of avionics parameters being indicative of an aircraft aviation context corresponding to the modified flight operation of the aircraft;

receive contextual flight operations data corresponding to the modified flight operation of the aircraft, the contextual flight operation data being received from at least one aviation cloud service, and the contextual flight operation data being indicative of an airspace aviation context corresponding to the modified flight operation of the aircraft;

combine the plurality of avionics parameters and the contextual flight operations data to generate a fused aviation data set, the fused aviation data set being indicative of a comprehensive aviation context corresponding to the modified flight operation of the aircraft;

detect a variation in the flight safety hazard based on the comprehensive aviation context;

ascertain the variation in the flight safety hazard to be detrimental to the modified flight operation of the aircraft;

analyze the fused aviation data set using a flight operation recommendation model to generate a plurality of flight operation recommendations, the flight operation recommendation model being a machine learning model trained on historical flight operations data corresponding to the variation in the flight safety hazard; and apply a flight operation recommendation from the plurality of flight operation recommendations to the modified flight operation of the aircraft;

wherein the modifying the current flight operation further comprises:

receiving an alternative flight path to avoid the flight safety hazard from ATC, wherein the flight safety hazard comprises a weather hazard and the variation in the flight safety hazard comprises movement of the weather hazard towards the alternative flight path; and applying the alternative flight path to the current flight operation.

14. The non-transitory computer readable medium of claim 13, further comprising the instructions to render the plurality of flight operation recommendations and flight operation parameters associated with the plurality of flight operation recommendations, the flight operation parameters comprising flight time score, fuel consumption score, and Air Traffic Controller (ATC) approval confidence score corresponding to the plurality of flight operation recommendations, the fuel consumption score being indicative of fuel savings associated with a flight operation recommendation, the flight time score being indicative of flight time reduction associated with the flight operation recommendation, and the ATC approval confidence score being indicative of chances of approval of the flight operation recommendation by the ATC.

15. The non-transitory computer readable medium of claim 14, further comprising the instructions to:

determine the fuel consumption score associated with at least one flight operation recommendation to be greater than a threshold;

submit the at least one flight operation recommendation to the ATC for approval.

16. The non-transitory computer readable medium of claim 14, further comprising the instructions to:

determine the flight time score associated with at least one flight operation recommendation to be greater than a threshold;

submit the at least one flight operation recommendation to the ATC for approval.

17. The non-transitory computer readable medium of claim 14, further comprising the instructions to:

determine the ATC approval confidence score associated with at least one flight operation recommendation to be greater than a threshold;

submit the at least one flight operation recommendation to the ATC for approval.

* * * * *